United States Patent [19]
Wang et al.

[11] Patent Number: 5,337,322
[45] Date of Patent: Aug. 9, 1994

[54] METHOD OF PROCESSING STORED DATA CONTAINING PARITY DATA

[75] Inventors: Yun-Huei Wang; Chung-Hua Wu, both of Taipei, Taiwan

[73] Assignee: Acer Incorporated, Taipei, Taiwan

[21] Appl. No.: 844,788

[22] Filed: Mar. 2, 1992

[51] Int. Cl.$^5$ .............................................. G06F 11/10
[52] U.S. Cl. .................................. 371/51.1; 371/49.1
[58] Field of Search .................... 371/51.1, 67.1, 50.1, 371/49.1, 49.2; 364/265.3, 921.91, 955, 564, 945.6; 395/575

[56] References Cited

U.S. PATENT DOCUMENTS 5,191,584  3/1993  Anderson ............................ 371/51.1
5,208,813  5/1993  Stallmo ............................... 371/10.1
5,257,362  10/1993 Menon ................................ 395/425

OTHER PUBLICATIONS

Randy M. Katz, Garth A. Gibson, and David A. Patterson "Disk System Architectures for High Performance Computing," Proceedings of the IEEE, vol. 77, No. 12, Dec. 1989.

*Primary Examiner*—Robert W. Beausoliel, Jr.
*Assistant Examiner*—Joseph E. Palys
*Attorney, Agent, or Firm*—Townsend and Townsend Khourie and Crew

[57] ABSTRACT

A method for efficiently storing data into a data storage system containing parity data comprises the steps of: determining the data storage units and the portions of each data storage unit where the data will be stored; determining the number of times the data units are accessed to calculate parity data for the new data, to store the new data, and to store the parity data using the complementary mode; determining the number of times the data units are accessed to calculate parity data for the new data, to store the new data, and to store the parity data using the noncomplementary mode; comparing the number times the data units are accessed using the complementary mode to the number of times the data units are accessed using the noncomplementary mode; calculating the parity data with the mode that requires the fewest number of accesses; and storing the calculated parity data and the new data in the data storage units. Thereby, the present invention minimizes the number of times the disk must be accessed to calculate parity.

10 Claims, 4 Drawing Sheets

|    | D0            | D1                  | D2                  | D3                  | D4                  |
|----|---------------|---------------------|---------------------|---------------------|---------------------|
| S0 | PS 00 / P 00  | DS 01 / DATA 01     | DS 02 / DATA 02     | DS 03 / DATA 03     | DS 04 / DATA 04     |
| S1 | PS 10 / P 10  | DS 11 / DATA 11     | DS 12 / DATA 12     | DS 13 / DATA 13     | DS 14 / DATA 14     |
| S2 | PS 20 / P 20  | DS 21 / DATA 21     | DS 22 / DATA 22     | DS 23 / DATA 23     | DS 24 / DATA 24     |
| S3 | PS 30 / P 30  | DS 31 / DATA 31     | DS 32 / DATA 32     | DS 33 / DATA 33     | DS 34 / DATA 34     |
| S4 | PS 40 / P 40  | DS 41 / DATA 41     | DS 42 / DATA 42     | DS 43 / DATA 43     | DS 44 / DATA 44     |

FIG. 1 (PRIOR ART)

|    | D0 | D1 | D2 | D3 | D4 |
|----|----|----|----|----|----|
| S0 | PS 00 / P 00 | DS 01 / DATA 01 | DS 02 / DATA 02 | DS 03 / DATA 03 | DS 04 / DATA 04 |
| S1 | DS 10 / DATA 10 | PS 11 / P 11 | DS 12 / DATA 12 | DS 13 / DATA 13 | DS 14 / DATA 14 |
| S2 | DS 20 / DATA 20 | DS 21 / DATA 21 | PS 22 / P 22 | DS 23 / DATA 23 | DS 24 / DATA 24 |
| S3 | DS 30 / DATA 30 | DS 31 / DATA 31 | DS 32 / DATA 32 | PS 33 / P 33 | DS 34 / DATA 34 |
| S4 | DS 40 / DATA 40 | DS 41 / DATA 41 | DS 42 / DATA 42 | DS 43 / DATA 43 | PS 44 / P 44 |

FIG. 2A (PRIOR ART)

METHOD OF PROCESSING STORED DATA CONTAINING PARITY DATA

BACKGROUND OF THE INVENTION

1. Field of the Invention

The present invention relates to a method of processing stored data containing parity data, and more particularly, to a method of storage management that allows data and its associated parity data to be written more quickly.

2. Description of the Prior Art

In current computer systems, central processing units (CPU) are attaining higher speeds for better system performance. However, when a CPU has to access data from a peripheral device such as a hard disk, this input/output (I/O) process seriously affects system performance because it requires mechanical motion such as moving the magnetic heads as data is being stored/read on the hard disk.

To eliminate the disadvantageous effect of accessing data on a hard disk, the conventional practice is to store data on multiple magnetic disks known as disk arrays. The use of a disk array increases the input/output bandwidth and improves the input/output performance.

To secure the integrity of the data stored in such multiple disk systems, a redundant magnetic disk is commonly added to the disk array in order to store parity data. This arrangement allows the integrity of the stored data to be enhanced without the need for a single, large and more expensive disk. This type of system is referred to as Redundant Arrays of Inexpensive Disks (RAID).

In RAID systems, there is a distinction made among grades, based on differences in performance. For example, in the RAID4 arrangement shown in FIG. 1, there are five magnetic disks D0, D1, D2, D3, and D4. Magnetic disk D0 is dedicated to storing the parity data P00, P10, P20, P30, and P40 associated with the data stored in disks D0, ..., D4. The parity data P00-P40 stored in sectors S0-S4 is obtained by executing an Exclusive-Or operation (indicated here by the symbol "+") between the data located in each of the remaining disks D1, ..., D4 which is associated with a given storage sector. In other words, where DATAsd represents the Data in Sector s of disk d, and Psd represents the parity data for sector s which is stored on disk d, P00=DATA01+DATA02+DATA03+DATA04;
P10=DATA11+DATA12+DATA13+DATA14;
P20=DATA21+DATA22+DATA23+DATA24;
P30=DATA31+DATA32+DATA33+DATA34;
and
P40=DATA41+DATA42+DATA43+DATA44.

If a block of data in a storage sector S0 is erased, then the erased data can be restored by performing an Exclusive-Or operation between the remaining data located on the same sector of the other disks and the parity data associated with that storage sector. For example, if DATA02 on disk D2 is erased, it may be recovered by performing an Exclusive-Or operation on the remaining data DATA01, DATA03, and DATA04, and the parity data P00 which is associated with sector S0. This may be shown as follows:

P00 + (DATA01 + DATA03 + DATA04) =
(DATA01 + DATA02 + DATA03 + DATA04) +
(DATA01 + DATA03 + DATA04) =

DATA02

In the above-mentioned RAID4 system it is possible, within a very short time, to modify data on the same sector of different disks, such as DATA01 and DATA03 which are in one storage sector, S0, and also to modify data, such as DATA14, in another storage sector, S1. Because the data in this example DATA01, DATA03, DATA14 is stored separately on different magnetic disks D1, D3, D4, it is possible to almost simultaneously modify the above-mentioned data, without requiring a wait state for moving the magnetic head several times and for other mechanical motions which would be required if the data were all stored on a single larger disk.

As shown in FIG. 1, when modifying the data in storage sectors S0 and S1, the related parity data P00 and P10, respectively, should also be modified in order to maintain data integrity. However, since the two sectors of parity data, P00 and P10, are within the same magnetic disk D0 as one another, a wait state is required for moving the magnetic head and for other mechanical motions of the magnetic disk D0.

FIG. 2A shows the RAID5 system. It differs from the RAID4 system in that the parity data is sequentially distributed in each magnetic disk. Thus, it is possible to almost simultaneously modify data in most storage locations during a request. Since the parity data P00, P11, P22, P33, P44 is not located in one magnetic disk, it is possible to save the wait state for the time formerly spent in moving the magnetic head and in other mechanical motions of the disk. Therefore, RAID5 has higher system efficiency than that of RAID4. Examples of RAID systems are described in "DISK SYSTEM ARCHITECTURES FOR HIGH PERFORMANCE COMPUTING", Randy H. Katz, Garth A. Gibson, and David A. Patterson, *IEEE: PROCEEDINGS OF THE IEEE*, VOL. 77, NO. 12, DECEMBER 1989, which is incorporated herein by reference.

From the above descriptions of the conventional techniques, the key factor affecting system performance is the wait state associated with mechanical motions during the accessing of magnetic disks. Therefore, if the number of times that the magnetic disk is accessed can be reduced, the overall system performance can be improved.

Consequently, there is a need for a method for writing the data to the magnetic disks faster by reducing the magnetic disk access time.

SUMMARY OF THE INVENTION

In accordance with the present invention, parity data for each sector is produced either by performing an Exclusive-Or operation between the data in the unmodified sectors and the modified data (referred to as the "complementary mode"), or by executing an Exclusive-Or operation between the modified data, the original data and the original parity data (referred to as the "noncomplementary mode").

More specifically, when data is to be written to a RAID storage system, the method of the present invention, first determines the disks where the data is to be allocated. Next, the number of times the storage system would be accessed to compute the new parity data with the complementary mode is determined. Next, the number of times the storage system would be accessed to compute the new parity data with the noncomplementary mode is determined. The method which requires the fewest storage accesses is then actually used to compute the new parity data, and store the new parity data along with the other data into the storage system.

BRIEF DESCRIPTION OF THE DRAWINGS

FIG. 1 shows a block diagram of a RAID4 system of the prior art with five magnetic disks, in which the disk D0 is used to store parity data;

FIG. 2A shows a block diagram of a RAID5 system, with five magnetic disks, in which parity data is stored sequentially;

DESCRIPTION OF THE PREFERRED EMBODIMENT

Figure 2B:
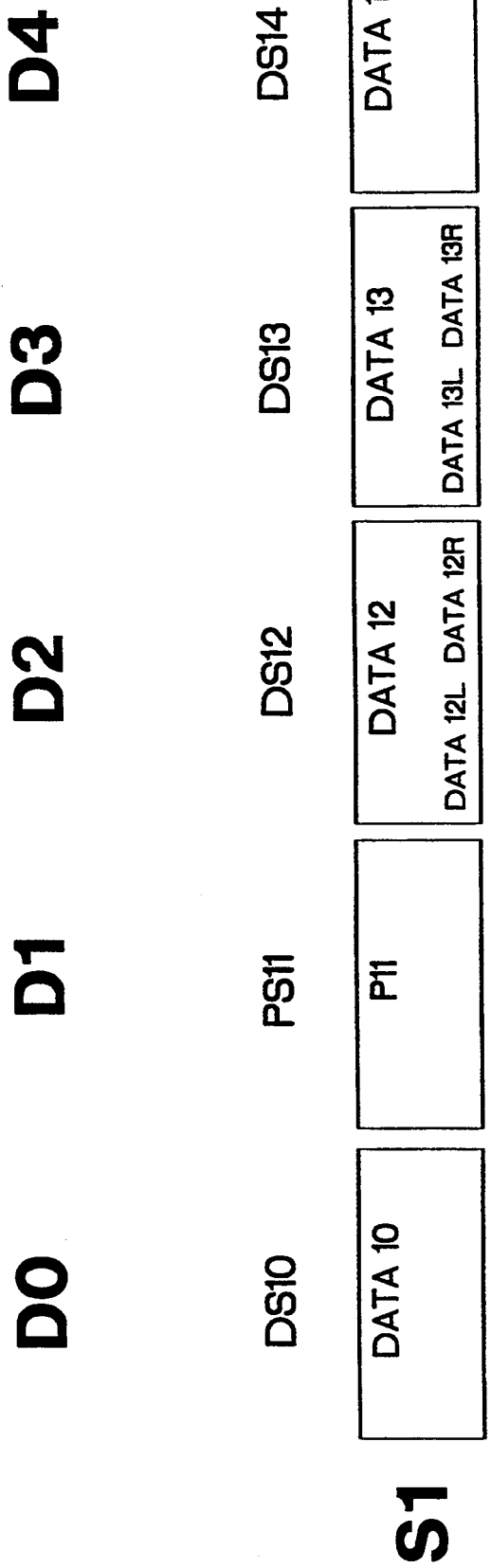
FIG. 2B shows another example of data storage in storage location S1.

Referring now to FIG. 2A, a preferred embodiment of the method of the present invention, operating on a RAID5 system containing five magnetic disks D0, D1, D2, D3, and D4, will be described. To distinguish between the unmodified data (original data) and the modified data (new data) in the magnetic disks in the following discussion, ODATA indicates the unmodified data and NDATA denotes the modified data. Additionally, OP indicates the original parity data and NP indicates the new parity data.

As mentioned above, when data is modified in a storage sector S, the original parity data OP for that sector must be replaced by the new parity data NP.

Assume that it is necessary to modify the data DATA21, which is in storage sector S2 in magnetic disk D1. In this situation, four access operations to the magnetic disk are required to update DATA21 with the new data NDATA21 and also calculate the new parity data NP22 if this is done with an Exclusive-Or operation between the unmodified data ODATA20, ODATA23, and ODATA24 in storage sector S2, and the modified data NDATA21 of sector S2. Four access operations are required because writing the modified data NDATA21 to magnetic disk D1 requires one disk access, and three more accesses are required to read out the unmodified data D0, D3, and D4 used for the Exclusive-Or operation with the modified data NDATA21 to produce the new parity data NP22. Note that no disk access is required to obtain the modified data NDATA21 because it is temporarily stored in the system's buffer. If we also include one more access of magnetic disk D2 for writing in the new parity data NP22 into storage sector S2, we can see that a total of five accesses to the magnetic disks is required if the complementary mode is utilized for generating the new parity data NP22.

Calculation of the new parity data NP22, utilizing the complementary mode may be represented as follows:

$$NP22 = ODATA20 + NDATA21 + ODATA23 + ODATA24 \qquad \text{Eq. I}$$

Referring to FIG. 2A, we may derive the following:

$$ODATA20 + ODATA23 + ODATA24 = DATA21 + (ODATA20 + ODATA21 + ODATA23 + ODATA24) = ODATA21 + OP22 \qquad \text{Eq. II}$$

Utilizing Eq. II, we can simplify Eq. I to produce Eq. III:

$$NP22 = NDATA21 + ODATA21 + OP22 \qquad \text{Eq. III}$$

The significance of Eq. III is that the new parity data NP22 can be produced by an Exclusive-Or operation on the original parity data OP22 together with both the modified data NDATA21 and the original data ODATA21. In the following discussion, producing new parity data using Eq. III will be referred to as the noncomplementary mode.

In examining the non-complementary mode of Eq. III, it can be seen that this mode requires only two magnetic disk accesses to produce the new parity data NP22. These two accesses are the readout of the unmodified data ODATA21 from magnetic disk D1 and the readout of the original parity data OP22 from magnetic disk D2. Recalling the three magnetic disk accesses which were required to produce the new parity data NP22 utilizing the complementary mode (Eq. I), it is apparent in this example, that utilization of the non-complementary mode saves one disk access.

The foregoing illustrates the first example of processing with the noncomplementary mode (Eq. III). In order to calculate the new parity data NP22, two magnetic disk accesses are required. Additionally, two more disk accesses are required for writing the new parity data NP22 and the modified data NDATA21 to magnetic disks D2 and D1, respectfully. Therefore, four magnetic disk accesses are required altogether.

This first example shows that one less access to the magnetic disk is required when using the noncomplementary mode (a total of four magnetic disk accesses) as compared to the complementary mode (a total of five magnetic disk accesses). However, the noncomplementary mode does not always reduce the number of magnetic disk accesses as compared to the number under the complementary mode.

A second example illustrates a case where use of the complementary mode requires fewer magnetic disk accesses than the noncomplementary mode. Referring again to FIG. 2A, it is assumed that data on multiple disks of the same sector must be modified such as: the data DATA21 in sector S2 of magnetic disk D1; the data DATA23 in sector S2 of magnetic disk D3; and the data DATA24 sector S2 of magnetic disk D4.

In the second example, the new parity data NP22 may be computed, according to tile complementary mode, with an Exclusive-Or operation between the unmodified data ODATA20 and the modified data NDATA21, NDATA23, and NDATA24. The computational formula is as follows:

$$NP22 = ODATA20 + NDATA21 + NDATA23 + NDATA24 \qquad \text{Eq. IV}$$

Before the above-mentioned modified data NDATA21, NDATA23, NDATA24 is written to magnetic disks D1, D3, and D4, this data is temporarily stored in buffers of the data processing system. To produce the new parity data NP22 mentioned above, the data processing system simply retrieves the modified data from the buffers; the system does not require that the modified data first be written to the magnetic disk, and then read out from these disks. Therefore, by utilizing the complementary mode in Eq. IV, the new parity data NP22 may be produced with just a single access of magnetic disk DO. In other words, the process is performed by reading out the unmodified data ODATA20 from magnetic disk DO and performing an Exclusive-Or operation with the modified data NDATA21, NDATA23, and NDATA24. After computing the new parity data NP22, the process is completed just by adding four more accesses to the magnetic disks. These four accesses are: a single write of the new parity data NP22 to the magnetic disk D2 and three writes to store the modified data NDATA21, NDATA23, and NDATA24 to magnetic disks D1, D3, and D4. Therefore, the entire process of modifying data NDATA21, NDATA23, and NDATA24 as shown in the second example, can be achieved by just five accesses to the magnetic disks.

By comparison, if the noncomplementary mode is utilized for producing the new parity data NP22 in the second example, then an Exclusive-Or operation will be performed on the original parity data OP22 and the modified data NDATA21, NDATA23, and NDATA24 as well as the original data ODATA21, ODATA23, and ODATA24. The computation equation is as follows:

$$NP22 = OP22 + NDATA21 + NDATA23 + NDATA24 + ODATA21 + ODATA23 + ODATA24 \quad \text{Eq. V}$$

From Eq. V, it can be seen that four magnetic disk accesses are required to generate the new parity data NP22. Specifically, magnetic disk D2 must be accessed to obtain the original parity data OP22, and magnetic disks D1, D3, and D4 must be accessed in order to obtain data ODATA21, ODATA23, and ODATA24. In addition, after the new parity data NP22 is produced, four more magnetic disk accesses are required to write the new parity data NP22 and the modified data NDATA21, NDATA23, and NDATA24 to the corresponding magnetic disks D2, D1, D3, and D4. Therefore, at least eight magnetic disk accesses are required using the noncomplementary mode.

The size of the storage sector S as shown in the first and second examples can be properly planned. For example, if the size of each storage sector S is 160K ($K = 2^{10}$), for RAID4 or RAID5 with a five-magnetic disk array, then the size of the storage location is 32K for the parity data sector as well as for each data sector used for storage of ordinary data. Thus, the parity data sector PS or the data sector DS can be planned, according to requirements, to be 32K, 64K, or even larger.

Furthermore, to clarify the explanation, in the first and second examples it was assumed that the modified data was the size of one data sector, and was stored so that it began at the first location of the data sector DS, and ended at the last location of the same data sector DS. However, in order not to waste storage locations, data can begin to be written at any location of the data sector, and possibly go through multiple data sectors. Generally, stored data does not end exactly at the end of the particular data sector.

The third example assumes that the block of data to be modified starts at a location that is not at the beginning of a data sector and ends in another data sector at a location that is not at the end of that other data sector. This example will be used to explain how the decision is made whether to use the complementary or the non-complementary mode for determining the new parity data NP.

As shown in FIG. 2A, it is assumed as mentioned above that the data that is required to be modified has been determined to begin to be written at disk 2, storage sector S1 at a location which begins at the right half of the sector DS12R and which ends at the left half of the sector DS13L of magnetic disk D3. The symbols R and L indicate, respectively, the right half and the left half section of a sector.

As shown in FIG. 2B to clarify the explanation, the data DATA12 in storage sector S1 of magnetic disk D2 is divided into left and right parts: the left data is indicated as DATA12L, and the right data is denoted by DATA12R. Furthermore, to distinguish between the unmodified data and the modified data, the prefix "O" will be used for unmodified data, and the prefix "N" will be used for modified data. Therefore, in data sector DS12, ODATA12L indicates the unmodified left sector data, NDATA12R indicates the modified right sector data, NDATA12L indicates the modified left sector data, and ODATA12R indicates the unmodified right sector data.

Similarly, in data sector DS13, ODATA13L indicates the unmodified left sector data, NDATA13L denotes the modified left sector data, ODATA13R indicates the unmodified right sector data, and NDATA13R indicates the modified right sector data.

In our third example, when utilizing the complementary mode to produce the new parity data NP11 it is necessary to perform an Exclusive-Or operation between the complete unmodified data sector (ODATA10), the complete unmodified data sector (ODATA14), a data sector comprising the unmodified left half of DATA 12 (ODATA12L) and the modified right half of DATA12 (NDATA12R), and a data sector comprising the modified left half of DATA 13 (NDATA13L) and the unmodified right half of DATA 13 (ODATA13R). This operation is shown as follows:

$$NP11 = ODATA10 + ODATA14 + ODATA12L + NDATA12R + NDATA13L + ODATA13R \quad \text{Eq. VI}$$

From Eq. VI, it is apparent that to produce the new parity data NP11 four accesses to the magnetic disk are necessary to read out the unmodified data ODATA10, ODATA14, ODATA12L, ODATA13R in order to execute the Exclusive-Or operation with the modified data which is temporarily stored in the system buffer. In addition, three more magnetic disk accesses are necessary in order to write the new parity data NP11 into magnetic disk D1, and to store the modified data NDATA12R and NDATA13L in the system buffer to magnetic disks D2 and D3. Therefore, in the case of the third example, the complementary mode requires a total of seven magnetic disk accesses.

From Eq. VI, a general equation can be derived which indicates the total number (Tc) of magnetic disk accesses which are required when using the complementary mode as follows:

$$Tc = Y + Z + 1$$

Where "Y" indicates the number of data sectors that will contain modified data, and "Z" indicates the number of data sectors that will contain unmodified data. The addition of "1" is necessary to account for the magnetic disk access attributed to writing the new parity data to the parity data sector PS.

A similar formula can be derived which indicates the number of disk access which are required when using the noncomplementary mode. Using tile third example again, it is apparent that the new parity data NP11 can be produced by an Exclusive-Or operation of the original parity data OP11 with the following data sectors: a data sector whose left half is zero (to indicate that it is unmodified data) and whose right half is the unmodified right half of DATA12 (ODATA12R), a data section whose left half is zero (to indicate that it is unmodified data) and whose right half is the modified right half of DATA12 (NDATA12R), a data sector whose left half is the unmodified left half of DATA13 (ODATA13L) and whose right half is zero (to indicate that it is unmodified data), and a data sector whose left half is the modified left half of DATA13 (NDATA13L) and whose right half is zero (to indicate that the right half of DATA13 is unmodified data). This operation of the noncomplementary mode is shown as follows:

$$NP11 = OP11 + 0,ODATA12R + 0,NDATA12\text{-}R + ODATA13L, 0 + NDATA13L,0 \qquad \text{Eq. VII}$$

From Eq. VII, it is apparent that to produce the new parity data NP11 three accesses to the magnetic disk are necessary to read out the unmodified data OP11, ODATA12R, and ODATA13L in order to execute the Exclusive-Or operations with the modified data which is temporarily stored in the system buffer. In addition, three more magnetic disk accesses are necessary in order to write the new parity data NP11 into magnetic disk D1, and the modified data NDATA12R and NDATA13L in the system buffer to magnetic disks D2 and D3. Therefore, for the situation in the third example, the noncomplementary mode requires a total of six magnetic disk accesses.

From Eq. VII, a general equation can be derived which indicates the total number ($T_N$) of magnetic disk accesses which are required when using the noncomplementary mode as follows:

$$T_N = Y \times 2 + 2$$

Where "Y" indicates the number of data sections that will have to be accessed to store the modified data. This number is multiplied by "2" because for every sector whose data will be modified, it is necessary to read out the original data located in that sector. The addition of "2" reflects one access that is required to write the new parity data to the magnetic disk and another access that is required to read out the original parity data OP11.

From the explanations of the first, second, and third examples mentioned above, determining whether the complementary or the noncomplementary mode should be used to process the data depends on the number of magnetic disk accesses required by each mode. If using the complementary mode requires fewer magnetic disk accesses than when the noncomplementary mode is used, then the former mode is chosen for data processing; otherwise, the noncomplementary mode is selected. The resulting parity data is the same, regardless of whether the complementary or noncomplementary mode is used.

Figure 3:
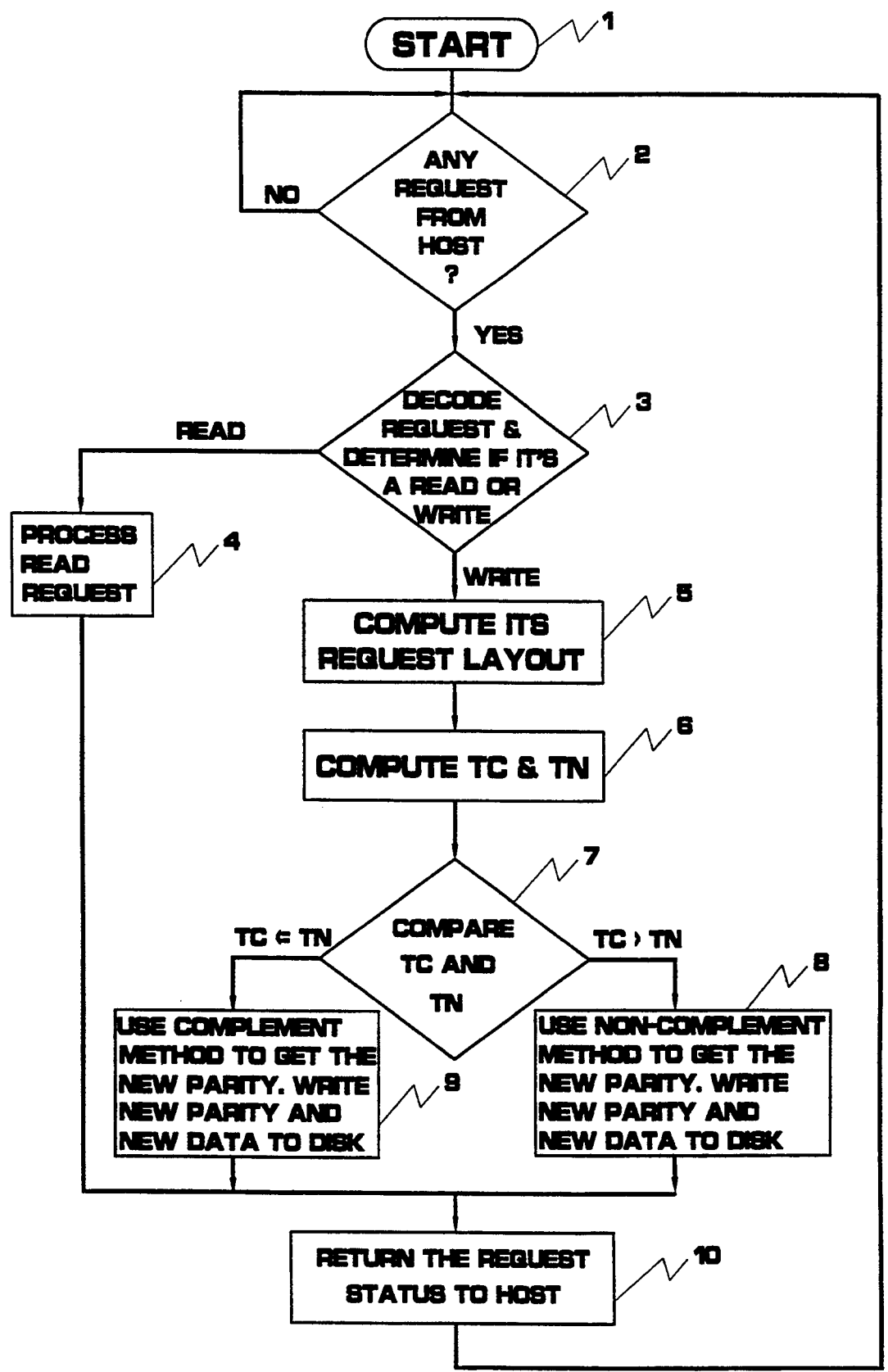
FIG. 3 is a flowchart for a preferred embodiment of the method of present invention for determining whether the complementary or non-complementary operations for data storage operations are to be adopted.

The flowchart shown in FIG. 3 illustrates the steps of a preferred embodiment of the method of the present invention for selecting either the complementary or the noncomplementary mode in storage and retrieval of data from a disk drive.

Step 1 begins the preferred process of the present invention.

In Step 2, the magnetic disk's decoding control unit (not shown) checks to see whether or not the host computer has requested any magnetic disk accesses (either read or write). If no requests are detected then step 2 is repeated; otherwise, the method continues to Step 3.

In Step 3, the host computer's command is decoded. If the command is for data to be read out from the magnetic disk, then control proceeds to step 4.

In Step 4, the Read Request is processed. Because the parity data does not have to be updated on a read request, there is no need to choose between the complementary and noncomplementary modes. Once the read request is complete, control proceeds to Step 10.

On the other hand, if the command decoded in step 3 is to write data to the magnetic disk, then control proceeds to Step 5. In Step 5, the write data command is examined in order to determine which data sectors are allocated for storing the new data and for producing allocation information. Control then proceeds to Step 6.

In Step 6, the allocation information that was determined in Step 5 is used to compute the total number of times ($T_C$) the magnetic disks would be accessed if the complementary mode is used, and the number of times ($T_N$) that the magnetic disks would be accessed if the noncomplementary mode is used. Then, the method proceeds to Step 7.

In Step 7, the access values $T_C$ and $T_N$ computed in Step 6 are compared. If the number of times $T_C$ is larger than $T_N$, then the noncomplementary mode will require fewer disk accesses and is executed in step 8. However, if the number of times $T_C$ is smaller than or equal to $T_N$, then the complementary mode will require fewer accesses (or the same number of accesses) as the noncomplementary mode, and processing continues at Step 9.

In Step 8, the new parity data is produced by using the noncomplementary mode described above. That new parity data and the modified data are then written to the magnetic disks. Processing then continues at Step 10.

In Step 9, the complementary mode described above is used to produce the new parity data, and that new parity and the modified data are then written to the corresponding magnetic disks. Processing then continues at Step 10.

In Step 10, the magnetic disk's control unit informs the host computer of the status of whether the magnetic disk has been successfully accessed. Processing then returns to Step 2 to await any further requests from the host computer.

The data processing method of this invention has the capability of improving system performance by allowing a magnetic disk controller to select the method for computing new parity data which will require the fewest number of disk accesses. Although this disclosure has described the application of the method to a magnetic disk storage system, it will be apparent to one skilled in the art that the method is not limited to this storage medium. The method of the present invention could be applied to other peripheral devices where time for accessing data is great when compared with the CPU speed.

What is claimed is:

1. A method for using new data to calculate parity data, and for storing new data and the parity data into a data storage system, said data storage system comprising a plurality of data storage units each capable of storing data, said method comprising the steps of:

(a) determining the data storage units and the portions of each data storage unit where the data will be stored;

(b) determining the number of times the data units are accessed to calculate parity data for the new data, to store the new data, and to store the parity data using a complementary mode;

(c) determining the number of times the data units are accessed to calculate parity data for the new data, to store the new data, and to store the parity data using a noncomplementary mode;

(d) comparing the number of times the data units are accessed in said complementary mode to the number of times the data units are accessed in said noncomplementary mode; and (e) calculating the parity data with the mode that requires the fewest number of accesses.

2. The method of claim 1, further comprising the steps of:

(f) storing the calculated parity data in the data storage units; and (g) storing the new data in the data storage units.

3. The method of claim 1, wherein the data storage system further comprises a host central processing unit (CPU), a decoding control unit, and the method further comprises the steps of:

(1) determining whether the host CPU has requested access to the data storage units;

(2) decoding a request from the host CPU to determine whether it is a read or a write operation;

(3) if the request is a read operation, then, processing the request without performing steps a–e; and (4) if the request is a write operation proceeding to step (a).

4. The method of claim 3, wherein said step of determining whether the host CPU has requested access to the data storage units is performed by the decoding control unit.

5. The method of claim 1, wherein the data storage units are disk drives having data sectors, and step (a) determines the data sectors on each disk drive that are allocated for the storage of the new data and the data sectors on each disk drive that are needed to calculate the parity data.

6. The method of claim 1, wherein the data storage units are disk drives having data sectors, and wherein step (b) determines the number of times the data units are accessed in the complementary mode using the equation:

$$T_C = Y + Z + 1$$

where "Y" indicates the number of data sectors that will contain new data, and "Z" indicates the number of data sectors that will not contain new data.

7. The method of claim 1, wherein the data storage units are disk drives having data sectors, and wherein step (c) determines the number of times the data units are accessed in the noncomplementary mode using the equation:

$$T_N = Y \times 2 + 2$$

where "Y" indicates the number of data sectors that will have to be accessed to store the new data.

8. The method of claim 1, wherein one of said data storage units is reserved for storing parity data corresonding the other data storage units.

9. The method of claim 1 wherein each of said plurality of data storage units is used for storing data, and wherein said parity data is distributed across all of said plurality of data storage units so that said parity data is not stored in two consecutive sectors of the same data storage unit.

10. The method of claim 1 wherein said plurality of data storage units is a plurality of magnetic disks in a RAID system.

* * * * *